US008656591B2

(12) United States Patent
Roessler et al.

(10) Patent No.: US 8,656,591 B2
(45) Date of Patent: Feb. 25, 2014

(54) FUEL INJECTOR

(75) Inventors: Manfred Roessler, Stuttgart (DE); Achim Degel, Illingen (DE); Rolf Keller, Rutesheim (DE); Markus Gesk, Karlsbad (DE); Guido Pilgram, Schwieberdingen (DE); Bernd Einwiller, Freudental (DE); Norbert Keim, Loechgau (DE); Michael Lingner, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 203 days.

(21) Appl. No.: 13/217,763

(22) Filed: Aug. 25, 2011

(65) Prior Publication Data

US 2011/0305823 A1 Dec. 15, 2011

Related U.S. Application Data

(62) Division of application No. 10/531,407, filed as application No. PCT/DE03/02211 on Jul. 2, 2003, now Pat. No. 8,020,789.

(30) Foreign Application Priority Data

Dec. 4, 2002 (DE) .................................. 102 56 662

(51) Int. Cl.
*B23P 25/00* (2006.01)
*B23P 17/00* (2006.01)
*B21K 3/00* (2006.01)

(52) U.S. Cl.
USPC .................. 29/890.1; 29/890.12; 29/890.131; 29/890.132; 29/527.2; 29/888.01

(58) Field of Classification Search
USPC ............. 29/890.1, 890.12, 890.129, 890.131, 29/890.132, 527.2, 527.4
See application file for complete search history.

(56) References Cited

U.S. PATENT DOCUMENTS

| | | | | |
|---|---|---|---|---|
| 4,230,027 | A | | 10/1980 | Promeyrat |
| 4,245,789 | A | | 1/1981 | Gray |
| 4,527,744 | A | | 7/1985 | Hafner et al. |
| 4,984,549 | A | | 1/1991 | Mesenich |
| 5,085,402 | A | | 2/1992 | O'Dell |
| 5,115,982 | A | | 5/1992 | Masenich |
| 5,226,975 | A | * | 7/1993 | Denton et al. ................ 148/220 |
| 5,340,032 | A | | 8/1994 | Stegmaier et al. |
| 5,732,888 | A | * | 3/1998 | Maier et al. ................ 239/585.1 |

(Continued)

FOREIGN PATENT DOCUMENTS

| | | |
|---|---|---|
| DE | 35 01 973 | 7/1985 |
| DE | 692 03 197 | 1/1996 |

(Continued)

*Primary Examiner* — David Bryant
*Assistant Examiner* — Jun Yoo
(74) *Attorney, Agent, or Firm* — Kenyon & Kenyon LLP

(57) ABSTRACT

A fuel injector for fuel injection systems of internal combustion engines includes a solenoid coil; an armature acted upon in a closing direction by a restoring spring; and a valve needle, which is connected to the armature in force-locking manner and on which a valve-closure member is formed, which forms a sealing seat together with a valve seat surface. The armature strikes against a stop face of an inner pole of the solenoid coil by way of a stop face, and the armature stop face is provided with a coating. The coating has a surface structure.

7 Claims, 1 Drawing Sheet

(56) References Cited

U.S. PATENT DOCUMENTS

| | | | | |
|---|---|---|---|---|
| 6,024,302 | A | 2/2000 | Sumida et al. | |
| 6,244,526 | B1 | 6/2001 | Schuldt et al. | |
| 6,324,978 | B1 * | 12/2001 | Kaulen et al. | 101/459 |
| 6,592,947 | B1 * | 7/2003 | McCane et al. | 427/427 |
| 6,607,143 | B2 | 8/2003 | Dallmeyer et al. | |
| 6,688,578 | B1 | 2/2004 | Nussio et al. | |
| 6,722,627 | B2 | 4/2004 | Murao et al. | |
| 6,764,061 | B2 | 7/2004 | Haeberer et al. | |
| 6,824,084 | B2 | 11/2004 | Maier et al. | |
| 6,840,500 | B2 | 1/2005 | Dallmeyer et al. | |
| 6,858,333 | B2 * | 2/2005 | Henderer | 428/698 |
| 6,964,815 | B2 | 11/2005 | Yoshitake et al. | |
| 7,011,257 | B2 | 3/2006 | Heyse | |
| 7,070,127 | B2 | 7/2006 | Maier | |
| 7,285,305 | B2 | 10/2007 | Furusawa et al. | |
| 8,196,600 | B1 * | 6/2012 | Bruce et al. | 137/375 |
| 2001/0029665 | A1 | 10/2001 | Hashimoto et al. | |
| 2002/0008320 | A1 | 1/2002 | Kuwabara et al. | |
| 2002/0084344 | A1 | 7/2002 | Dallmeyer et al. | |
| 2004/0000429 | A1 | 1/2004 | Furusawa et al. | |
| 2005/0133632 | A1 | 6/2005 | Hornby | |
| 2005/0175777 | A1 | 8/2005 | Hasaki et al. | |
| 2006/0071102 | A1 | 4/2006 | Dallmeyer et al. | |
| 2006/0076438 | A1 | 4/2006 | Dallmeyer et al. | |
| 2010/0304065 | A1 * | 12/2010 | Tomantschger et al. | 428/35.8 |

FOREIGN PATENT DOCUMENTS

| | | |
|---|---|---|
| DE | 199 60 605 | 7/2001 |
| EP | 0 683 862 | 11/1995 |
| JP | 60153467 | 8/1985 |
| JP | 8506876 | 7/1996 |
| JP | 10 159688 | 9/1998 |
| WO | 95 16125 | 6/1995 |

* cited by examiner

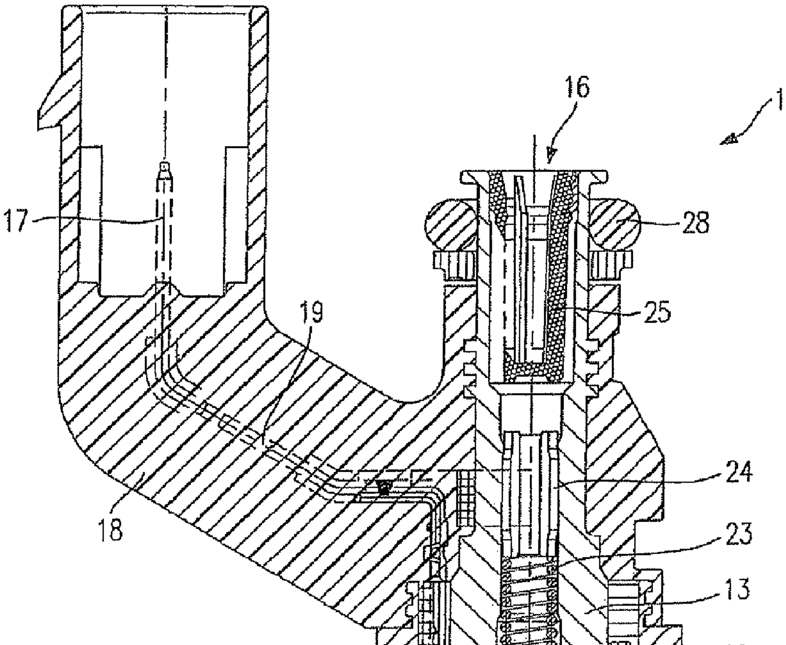
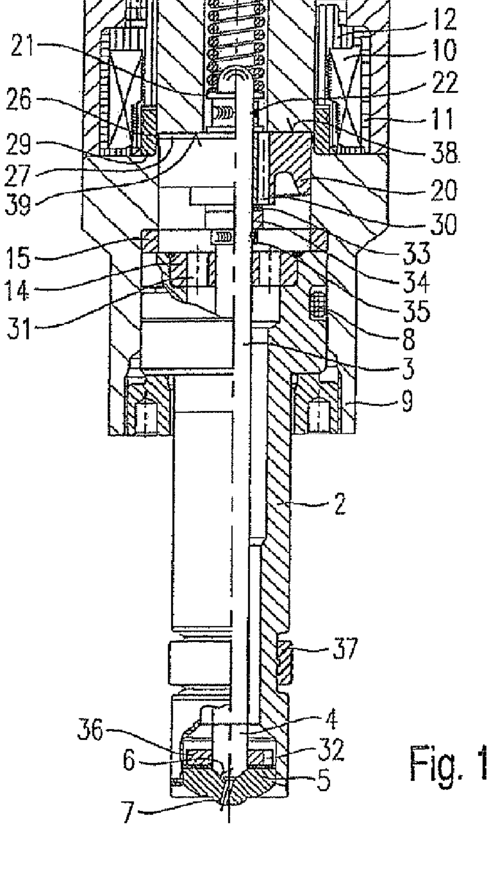
Fig. 1
Fig.2A
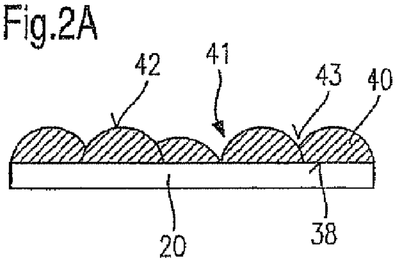
Fig.2B
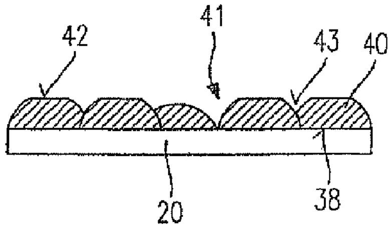

FUEL INJECTOR

CROSS-REFERENCE TO RELATED APPLICATIONS

This application is a divisional application of U.S. patent application Ser. No. 10/531,407, filed Apr. 14, 2005, now U.S. Pat. No. 8,020,789 which is the U.S. national phase of international application PCT/DE03/02211 filed on Jul. 2, 2003, and claims priority to German Patent Application No. 102 56 662.3, filed on Dec. 4, 2002, all of which are hereby incorporated by reference in their entirety.

BACKGROUND INFORMATION

From European Patent No. 0 683 862 an electromagnetically operable fuel injector is known whose armature is characterized in that the armature stop face facing the inner pole has a slightly wedge-shaped design in order to minimize or completely eliminate the hydraulic damping upon opening of the fuel injector and the hydraulic adhesion force after interruption of the current that energizes the solenoid coil. In addition, owing to suitable measures such as vapor deposition and nitration, the stop face of the armature is wear-resistant, so that the stop face has the same size during the entire service life of the fuel injector and the functioning method of the fuel injector is not impaired.

Disadvantageous in the fuel injector known from European Patent No. EP 0 683 862, in spite of the optimized armature stop face, is primarily the hydraulic damping force still acting in the working gap upon pull-up of the armature. If an excitation current is applied to the solenoid coil, the armature moves in the direction of the inner pole and, in so doing, displaces the fuel present between the inner pole and the armature. Because of frictional and inertia effects, a local pressure field builds up which produces a hydraulic force on the armature stop face that acts counter to the moving direction of the armature. The opening and fuel-metering times of the fuel injector are thereby prolonged.

SUMMARY

In contrast to the related art, the fuel injector according to the present invention has the advantage that, owing to the design of the surface structure of the coating applied on the armature, the armature stop face is not only effectively protected, but the hydraulic damping force is greatly reduced as well, so that the fuel injector is able to be opened more quickly, which results in more precise metering times and metering quantities and also in increased robustness during continuous operation.

A particular advantage is that the coating has raised and recessed areas; the difference in height between the areas is dimensioned in such a way that the recessed areas will remain below the raised region even after lengthy operation.

The height different is advantageously between 5 μm and 10 μm, which is higher than the normal removal after the breaking-in phase.

The coating is advantageously made up of one or a plurality of chromium layer(s).

BRIEF DESCRIPTION OF THE DRAWINGS

FIG. 1 shows an axial section through a fuel injector according to the related art.

FIG. 2A shows a highly schematized, enlarged cut-away portion from an exemplary embodiment of a newly coated armature of a fuel injector according to the present invention.

FIG. 2B shows a highly schematized, enlarged cut-away portion from the exemplary embodiment of the armature shown in FIG. 2A, after an extended operating phase.

DETAILED DESCRIPTION

Before an exemplary embodiment of an armature of a fuel injector according to the present invention is described more precisely with reference to FIGS. 2A and 2B, to better understand the invention, an already known fuel injector shall first be briefly explained with respect to its important components with the aid of FIG. 1.

An exemplary embodiment of a fuel injector 1 according to the present invention, shown in FIG. 1, is designed in the form of a fuel injector for fuel-injection systems of mixture-compressing internal combustion engines having externally supplied ignition. Fuel injector 1 is especially suited for the direct injection of fuel into a combustion chamber (not shown) of an internal combustion engine.

Fuel injector 1 is made up of a nozzle body 2 in which a valve needle 3 is positioned. Valve needle 3 is in operative connection with a valve-closure member 4, which cooperates with a valve-seat surface 6 positioned on a valve-seat member 5 to form a sealing seat. In the exemplary embodiment, fuel injector 1 is an inwardly opening fuel injector 1, which has one spray-discharge orifice 7. Seal 8 seals nozzle body 2 from an outer pole 9 of a solenoid coil 10. Solenoid coil 10 is encapsulated in a coil housing 11 and wound on a coil brace 12, which rests against an inner pole 13 of solenoid coil 10. Inner pole 13 and outer pole 9 are separated from one another by a constriction 26 and interconnected by a non-ferromagnetic connecting part 29. Solenoid coil 10 is energized via a line 19 by an electric current, which may be supplied via an electrical plug contact 17. A plastic extrusion coat 18, which may be extruded onto inner pole 13, encloses plug contact 17.

Valve needle 3 is guided in a valve-needle guide 14, which is disk-shaped. A paired adjustment disk 15 is used to adjust the (valve) lift. Armature 20 is on the other side of adjustment disk 15. Via a first flange 21, it is in force-locking connection to valve needle 3 which is connected to first flange 21 by a welded seam 22. Braced on first flange 21 is a restoring spring 23, which is prestressed by a sleeve 24 in the present design of fuel injector 1.

Fuel channels 30, 31 and 32 extend in valve-needle guide 14, armature 20 and along a guide element 36. The fuel is supplied via a central fuel supply 16 and filtered by a filter element 25. A seal 28 seals fuel injector 1 from a fuel distributor line (not shown further) and an additional seal 37 seals it from a cylinder head (not shown further).

Arranged on the spray-discharge side of armature 20 is an annular damping element 33 made of an elastomeric material. It rests on a second flange 34, which is joined to valve needle 3 by force-locking via a welded seam 35.

In the quiescent state of fuel injector 1, armature 20 is acted upon by restoring spring 23 against its direction of lift, in such a way that valve-closure member 4 is held in sealing contact on valve-seat surface 6. If solenoid coil 10 is energized, it generates a magnetic field that moves armature 20 in the lift direction, counter to the spring force of restoring spring 23, the lift being predefined by a working gap 27 that occurs in the rest position between inner pole 12 and armature 20. First flange 21, which is welded to valve needle 3, is taken along by armature 20, in the lift direction as well. Valve-closure member 4, being connected to valve needle 3, lifts off from valve seat surface 6, and fuel guided via fuel channels 30 through 32 is spray-discharged through spray-discharge orifice 7.

If the coil current is interrupted, following sufficient decay of the magnetic field, armature 20 falls away from inner pole 13 due to the pressure of restoring spring 23, whereupon first flange 21, being connected to valve needle 3, moves in a direction counter to the lift. Valve needle 3 is thereby moved in the same direction, causing valve-closure member 4 to set down on valve seat surface 6 and fuel injector 1 to be closed.

FIG. 2A shows an armature stop face 38 facing inner pole 13 of fuel injector 1 in a highly schematized, cut-away view. Armature 20 may have the same design as in fuel injector 1 already described in greater detail in FIG. 1.

According to the present invention, armature stop face 38 is provided with a coating 40, which not only protects armature stop face 38 and a corresponding stop face 39 at inner pole 13 from wear, but by its special surface structure 41 also provides for a rapid flow-off of the fuel when armature 20 is pulled up in response to an energizing of solenoid coil 10, thereby not interfering with the opening operation of fuel injector 1. Furthermore, the cavitation of armature stop face 38 as well as stop face 39 of inner pole 13 is reduced since the fuel is not intermingled.

Surface structure 41 has raised and recessed areas 42, 43, which are achieved by means of a corresponding coating method. Chromium is preferably used for coating 40, which is deposited onto armature stop face 38 of armature 20 in a plurality of layers. This in particular results in raised areas 42 formed in the shape of a dome, between which recessed areas 43 are formed.

As can be expected, the surface that is provided as armature stop face 38 by the alternating raised and recessed areas 42, 43 is smaller than an evenly flat armature stop face 38, so that less hydraulic adhering can be observed between armature stop face 38 and stop face 39 of inner pole 13 during closing of fuel injector 1.

On the other hand, after a beginning phase in continuous operation, surface structure 41 is worn away as can be seen in FIG. 2B, to such an extent that a stable surface structure 41 comes about with very low subsequent wear (breaking in), which nevertheless continues to have recessed areas 43 used for drainage. The height difference existing between raised and recessed areas 42, 43 prior to breaking in is between 5 μm and 10 μm and is reduced according to the typical wear depths by approximately 4 μm to 5 μm. This ensures effective draining of armature stop face 38 and at the same time provides a large contact area between armature stop face 38 and stop face 39 of inner pole 13.

The present invention is not confined to the embodiment shown, and may also be implemented with a multitude of other fuel injector designs. As an alternative or in addition, coating 40 may also be provided on stop face 39 of inner pole 13.

What is claimed is:

1. A method of making an armature of a fuel injector for a fuel injection system of an internal combustion engine, the fuel injector including a solenoid coil, a restoring spring acting upon the armature in a closing direction and a valve needle, which is connected to the armature by force-locking and at which a valve-closure member is formed, which forms a sealing seat together with a valve-needle surface, the armature facing and striking against a stop face of an inner pole of the solenoid coil by way of an armature stop face, the method comprising:

depositing a plurality of chromium layers onto a surface of the armature stop face, the deposition of the plurality of layers forming raised areas and recessed areas, the raised areas having a dome-shaped design, wherein the raised areas have a dome-shaped design and a height difference between the raised areas and recessed areas is initially between 5 μm and 10 μm and is reduced to between 4 μm and 5 μm during use of the fuel injector.

2. The method of claim 1, wherein the raised areas are formed by depositing a greater thickness of chromium in the raised areas compared to the recessed areas.

3. A method of making a fuel injector for a fuel injection system of an internal combustion engine, the method comprising:

making an armature by depositing a plurality of chromium layers onto a surface of an armature stop face, the deposition of the plurality of layers forming raised areas and recessed areas, the raised areas having a dome-shaped design, wherein the raised areas have a dome-shaped design and a height difference between the raised areas and recessed areas is initially between 5 μm and 10 μm and is reduced to between 4 μm and 5 μm during use of the fuel injector.

4. The method of claim 3, further comprising:

depositing a plurality of chromium layers onto a stop face of an inner pole, the deposition of the plurality of layers forming raised areas and recessed areas, the raised areas having a dome-shaped design, wherein the raised areas have a dome-shaped design and a height difference between the raised areas and recessed areas is initially between 5 μm and 10 μm and is reduced to between 4 μm and 5 μm during use of the fuel injector.

5. A method of making an inner pole of a solenoid coil of a fuel injector for a fuel injection system of an internal combustion engine, the fuel injector including, an armature acted upon in a closing direction by a restoring spring, and a valve needle, which is connected to the armature by force-locking and at which a valve-closure member is formed, which forms a sealing seat together with a valve-needle surface, the armature facing and striking against a stop face of the inner pole of the solenoid coil by way of an armature stop face, the method comprising:

depositing a plurality of chromium layers onto the stop face of the inner pole, the deposition of the plurality of layers forming raised areas and recessed areas, the raised areas having a dome-shaped design, wherein the raised areas have a dome-shaped design and a height difference between the raised areas and recessed areas is initially between 5 μm and 10 μm and is reduced to between 4 μm and 5 μm during use of the fuel injector.

6. The method of claim 5, wherein the raised areas are formed by depositing a greater thickness of chromium in the raised areas compared to the recessed areas.

7. A method of making a fuel injector for a fuel injection system of an internal combustion engine, the method comprising:

making an inner pole of a solenoid coil by depositing a plurality of chromium layers onto a stop face of the inner pole, the deposition of the plurality of layers forming raised areas and recessed areas, the raised areas having a dome-shaped design, wherein the raised areas have a dome-shaped design and a height difference between the raised areas and recessed areas is initially between 5 μm and 10 μm and is reduced to between 4 μm and 5 μm during use of the fuel injector.

* * * * *